No. 733,487. PATENTED JULY 14, 1903.
E. H. KREBS.
WASHER.
APPLICATION FILED NOV. 26, 1902.
NO MODEL.

WITNESSES
Chas. L. Hyde.
M. C. Nickelson.

INVENTOR
Eduart H. Krebs.
BY Hazard & Harpham.
ATTORNEYS

No. 733,487. Patented July 14, 1903.

UNITED STATES PATENT OFFICE.

EDUART H. KREBS, OF OXNARD, CALIFORNIA.

WASHER.

SPECIFICATION forming part of Letters Patent No. 733,487, dated July 14, 1903.

Application filed November 26, 1902. Serial No. 132,959. (No model.)

*To all whom it may concern:*

Be it known that I, EDUART H. KREBS, a citizen of the United States, residing at Oxnard, in the county of Ventura and State of California, have invented new and useful Improvements in Washers for Filter-Presses Used in the Manufacture of Sugar, of which the following is a specification.

The object of my invention is to provide a suitable washer for placement in the frames of the filter-press to provide an elastic channel through which the sugar and lime in solution and water may be fed to the press and dispense with the use of solid-rubber washers now in use in that connection. I accomplish this by means of the device herein described, and shown in the accompanying drawings, in which—

Figure 1:
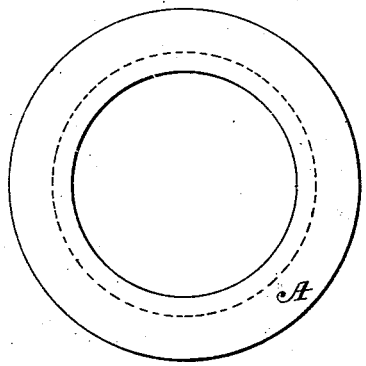
Figure 2:
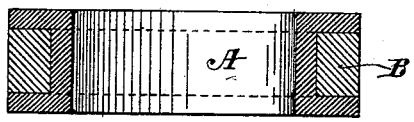
Figure 3:
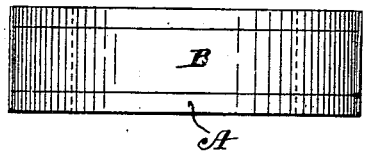

Figure 1 is a plan of my improved washer. Fig. 2 is a central transverse section thereof, and Fig. 3 is an edge view.

In the drawings, A is the rubber part of the washer, and B is an annular wooden ring surrounded on three sides by the rubber. This ring may be made of any other suitable material and dispense with rubber in the place occupied by the annular wooden ring. The rubber being elastic is easily placed inside and removed from the wooden ring when worn or injured and a new rubber inserted in place thereof. Heretofore when these rubber rings became unfit for use they were thrown away and a new ring substituted therefor, and rubber being an expensive article great loss was occasioned thereby; but by the use of my improved ring great saving is effected thereby.

Having described my invention, what I claim as new, and desire to secure by Letters Patent, is—

1. A washer for filter-presses comprising an annular rubber ring having in the outer side thereof an annular recess, in combination with an annular wooden ring adapted to fit in said recess.

2. An annular rubber ring having in its outer circumference an annular recess for the reception of an annular wooden ring; and an annular wooden ring therein.

In witness that I claim the foregoing I have hereunto subscribed my name this 18th day of November, 1902.

EDUART H. KREBS.

Witnesses:
PH. R. W. OSNER,
J. ANLAUF.